UNITED STATES PATENT OFFICE.

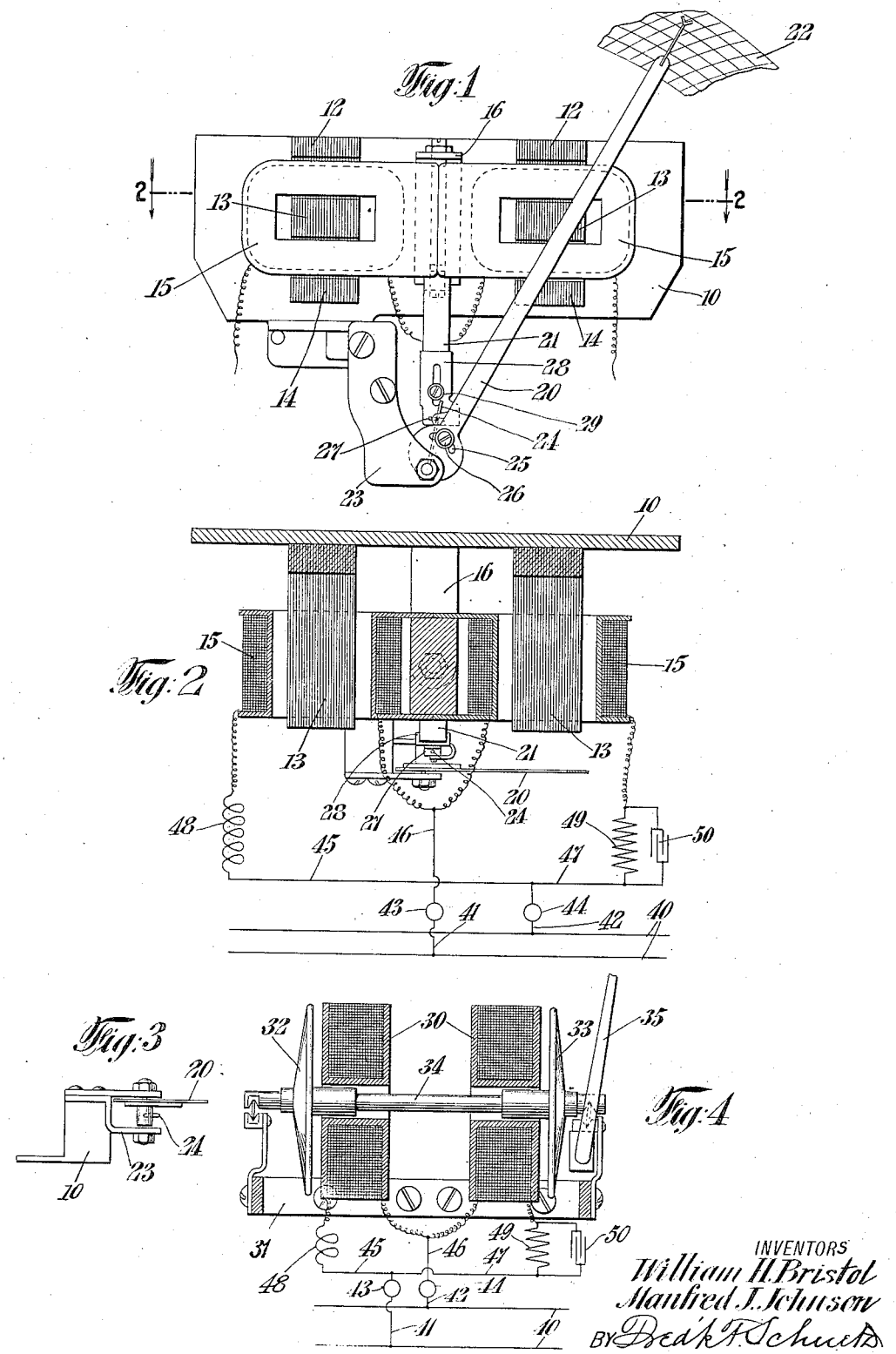

WILLIAM H. BRISTOL, OF WATERBURY, AND MANFRED J. JOHNSON, OF NAUGATUCK, CONNECTICUT, ASSIGNORS TO THE BRISTOL COMPANY, OF WATERBURY, CONNECTICUT, A CORPORATION OF CONNECTICUT.

FREQUENCY-MEASURING INSTRUMENT.

1,203,307.      Specification of Letters Patent.      Patented Oct. 31, 1916.

Application filed May 3, 1915. Serial No. 25,411.

*To all whom it may concern:*

Be it known that we, WILLIAM H. BRISTOL and MANFRED J. JOHNSON, citizens of the United States, and residents of Waterbury and Naugatuck, respectively, both cities in the county of New Haven and State of Connecticut, have invented certain new and useful Improvements in Frequency-Measuring Instruments, of which the following is a specification.

The invention relates to electrical measuring apparatus, and more particularly to apparatus for indicating or recording variations in frequency of an alternating current circuit.

It has for its object an instrument of this character which shall be susceptible to slight changes of frequency and afford a wide range of movement for a small variation.

A further object of the invention is to render the instrument substantially independent of the fluctuations of current or voltage of the circuit.

The nature of the invention will be best understood when described in connection with the accompanying drawings, in which—

Figure 1 is a front elevation of the mechanism with inclosing casing removed. Fig. 2 is a vertical section taken on the line 2—2, Fig. 1. Fig. 3 is a fragmentary detail view of a portion of the measuring pointer mounting. Fig. 4 is a vertical section illustrating a modification, etc.

Referring to Figs. 1 to 3 of the drawings, 10 designates a suitable base or frame plate from which project two sets of laminated iron cores, each being provided preferably with three arms 12, 13 and 14 as shown in the drawing, although they may be of other approved form. The central arms 13 are adapted to enter within solenoids 15, while the arms 12 and 13 surround the same at the top and bottom. The two said solenoids 15 are rigidly connected to each other, and are pivotally mounted upon a bifurcated standard 16 attached to the plate 10 between the said solenoids, the mounting being such that as one solenoid penetrates to a greater extent within its core the other moves out from the same, and vice versa. A measuring arm or pointer 20 is adapted to be connected to a shaft or rod 21 extending outwardly from the solenoids and partaking of the movement thereof as they rock under variation of the current flowing through and as will hereinafter be set forth. The said pointer 20 may be arranged to coöperate with a suitable scale 22 to indicate the position of the said solenoids relatively to their cores or to also record such position. In mounting the pointer 20, the inner end is pivotally held in a bracket 23, Figs. 1 and 3, attached to the frame 10; and from this end extends outwardly toward the rock shaft 21 a rod or pin 24, the axis of the said shaft and the axis of oscillation of the pointer being relatively displaced. The zero position of the said pointer is rendered adjustable by providing a slot 25 therein lying in an arc about the axis of oscillation and through which slot passes a locking screw 26. The outer and free end of rod 24 is arranged to slide through a hole of a perforated block 27 which is pivotally carried by a bracket 28 attached to the rock shaft 21. This bracket is slotted and adjustable relatively to the rock shaft for calibration adjustment and scale length, as by means of a screw 29.

In Fig. 4 a modification is illustrated, the solenoids 30 being stationary in that they are attached to a frame piece 31. The said solenoids are, in this embodiment, adapted to attract corresponding armatures 32 and 33 in the form of disks of soft iron having sleeves of soft iron extending within the solenoids and rigidly mounted upon a common non-magnetic rod 34. This rod passes centrally through said solenoids and is mounted to rock longitudinally and to thereby actuate a measuring arm 35, as is well understood and forms no part of the present invention, which relates more particularly to the manner of energizing the solenoids to effect the relative motion between the same and coöperating members as the cores 12, 13 and 14, Figs. 1 and 2, or the armatures 32 and 33, Fig. 4. To effect this energization of the solenoids from an electrical circuit 40, upon which an alternating current is impressed, connection is made from the latter through suitable leads 41 and 42 to the corresponding terminals 43 and 44 of the instrument. These terminals are connected to the respective solenoids through two parallel circuits, the one consisting of a conductor 45 and a conductor 46, and the other of the common conductor 46 and a conductor 47. In the conductor 45 is included in series therewith a suitable inductive reactance 48; and in the conductor 47 is included in series therewith a non-inductive resistance 49 about which is shunted also, a capacity reactance 50. The impedance of the two circuits will, therefore, be different and the relative values of resistances and reactances are so chosen that the effects of the current on the solenoids included in the two circuits will cause the pointer to assume its neutral position, which corresponds to some particular frequency of the alternating current. As soon, however, as a change in frequency occurs, the value of the effective current passing through the circuit 45—46 will be different from that passing through circuit 46—47; and their respective solenoids will respond accordingly, effecting a movement in one direction when the frequency is below the predetermined normal and in the other direction when above. A variation in the impressed voltage or current of the alternating current circuit 40 will be substantially without effect upon the solenoids in view of the balanced condition of the two parallel circuits 45—46 and 46—47.

We claim:—

An instrument for measuring variations in frequency of an alternating current circuit, comprising: two circuits connected in parallel, a solenoid included in each of said circuits, and magnetic members of mass relatively large with respect to the solenoids and coöperating therewith to effect a relative movement between the former and the latter, and affording a strong inductive effect in the circuits, and one circuit containing capacity to counteract the inductive reactance of the circuit and provide for a substantially constant current therethrough under different frequencies, whereby a maximum directive force is developed, permitting the use of an open scale, and means to measure the said relative movement between the solenoids and magnetic members.

Signed at Waterbury, in the county of New Haven and State of Connecticut, this 30th day of April A. D. 1915.

WILLIAM H. BRISTOL.
MANFRED J. JOHNSON.